United States Patent
Komine

(10) Patent No.: US 6,229,939 B1
(45) Date of Patent: May 8, 2001

(54) HIGH POWER FIBER RIBBON LASER AND AMPLIFIER

(75) Inventor: Hiroshi Komine, Torrance, CA (US)

(73) Assignee: TRW Inc., Redondo Beach, CA (US)

( * ) Notice: Subject to any disclaimer, the term of this patent is extended or adjusted under 35 U.S.C. 154(b) by 0 days.

(21) Appl. No.: 09/325,108

(22) Filed: Jun. 3, 1999

(51) Int. Cl.[7] .................................................. G02B 6/26

(52) U.S. Cl. ........................ 385/29; 385/27; 385/37; 385/114; 372/6

(58) Field of Search ................................ 385/29, 27, 28, 385/114, 129–132, 123, 146, 37; 372/6, 70, 75

(56) References Cited

U.S. PATENT DOCUMENTS

| | | | |
|---|---|---|---|
| 4,932,263 | * 6/1990 | Wlodarczyk | 73/705 |
| 5,351,331 | * 9/1994 | Chun et al. | 385/97 |
| 5,677,920 | * 10/1997 | Waarts et al. | 372/6 |
| 5,991,314 | * 11/1999 | Ionov et al. | 372/6 |
| 6,091,870 | * 7/2000 | Eldada | 385/37 |
| 6,111,998 | * 8/2000 | Ido et al. | 385/29 |

OTHER PUBLICATIONS

Patel et al. "Compact, Low–Crosstalk, WDM Filter Elements for Multimode Ribbon Fiber Data Links", Electrnic Components and Technology Conference, pp. 1261–1264, Sep. 1999.*

DiGiovanni, David J., "High Power Fiber Lasers and Amplifiers," Fibers and Waveguide Devices, Feb. 3, 1999, pp. 282–284.

Nilsson, Jr. et al., "Widely tunable high–power diode–pumped double–clad $Yb^3$–doped fiber laser," Fibers and Waveguide Devices, Feb. 3, 1999, pp. 285–287.

* cited by examiner

Primary Examiner—Rodney Bovernick
Assistant Examiner—Ellen E. Kim
(74) Attorney, Agent, or Firm—Michael S. Yatsko

(57) ABSTRACT

A single-mode fiber laser (66) that provides increased power. The fiber laser (66) includes a fiber ribbon (30) having a plurality of parallel waveguides (10). Each waveguide (10) includes a rectangular shaped core (12) that has a relatively thin dimension in one direction and a relatively wide dimension in an orthogonal direction. A step-index cladding (14, 16) is provided in the thin direction to limit the propagation of light in the core (12) to a single mode in that direction. Mode filters (18, 20) are provided adjacent the ends of the core (12) in the thickness direction and the various propagation modes in the core (12) enter the mode filters (18, 20). The mode filters (18, 20) guide the desirable single-mode back into the core (12) and reject the other modes away from the core (12). Light absorbing layers (22, 24) are provided adjacent the mode filters (18, 20) and opposite the core (12) to absorb the undesirable propagation modes of light. Therefore, the main propagation mode in the core (12) is a single low order mode, but the cross-sectional area of the core (12) is increased to provide more power. Each of the cores (12) in the ribbon (30) are optically pumped form the side by a bar (40) of diode arrays (42) positioned at strategic locations along the length of the ribbon (30) relative to the waveguides (10). Various transmission gratings (48) and/or reflection gratings (50) can be provided within a ribbon jacket (32) to launch the optical pump light down the waveguide (10). The ribbon (30) can be wrapped around a mandrel (68) and a cooling fluid can be introduced through the mandrel (68) to cool the ribbon (30) during laser operation.

31 Claims, 4 Drawing Sheets

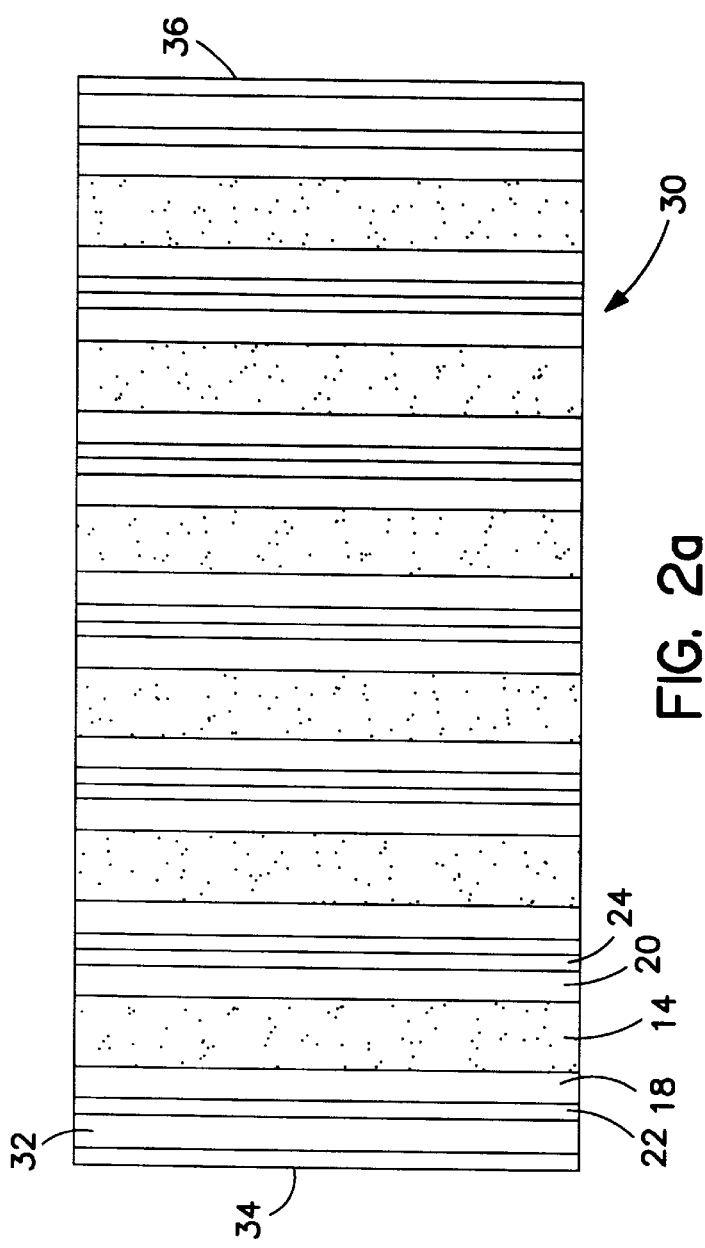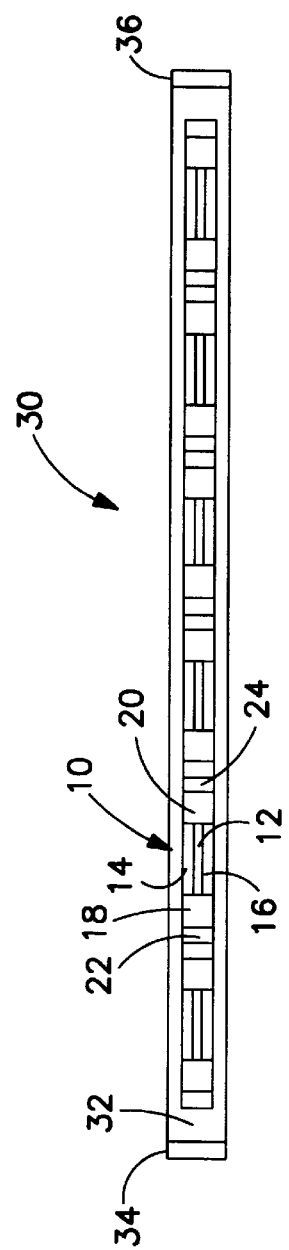

HIGH POWER FIBER RIBBON LASER AND AMPLIFIER

BACKGROUND OF THE INVENTION

1. Field of the Invention

This invention relates generally to a single spatial mode laser and, more particularly, to a high power, single-mode, diode-pumped, fiber ribbon laser having a rectangular shaped core, where laser waveguides of the laser employ mode filters to remove higher-order propagation modes from the core.

2. Discussion of the Related Art

There exists a need in the art for an electrically driven laser that has a high average power, but does not employ chemical laser fuel or effluent. These types of lasers have many applications, including military applications against a variety of airborne threats, such as ballistic missiles, cruise missiles, and tactical aircraft. Diode-pumped, solid-state lasers employing an array of fiber laser waveguides or amplifiers is one known laser that satisfies this need. A practical technique is needed to make fiber lasers into rugged devices without complex optical components to produce useful and affordable laser systems.

Typically, for applications of this type, the laser system must employ a fiber or core that generates a single-mode laser beam. This is because a single-mode laser beam generates the most intensity or power per unit area when the beam is focused. As the number of transverse modes of the laser beam increases, the size of the beam spot that can be focussed also increases as a result of beam diffraction. This reduces the beam power per unit area, which reduces its intensity.

Diode-pumped, dual-clad ytterbium-doped glass fiber lasers have been used in the art to generate single-mode laser beams, generally having an output power up to 50 watts. The fibers in these lasers typically employ a round core having a diameter on the order of 5–8 microns to generate the single-mode laser beam. An inner cladding layer around the core traps the single-mode beam within the core, and an outer cladding layer reflects pump light across the core to be absorbed. A discussion of this type of fiber laser can be found in the proceedings for a conference on Advanced Solid-State Lasers, including DiGiovanni, David J., "High Power Fiber Lasers and Amplifiers," Fibers and Waveguide Devices, Feb. 3, 1999, pgs. 282–284, and Nilsson, J. et al., "Widely tunable high-power diode-pumped double-clad $Yb^{3+}$-doped fiber laser," Fibers and Waveguide Devices, Feb. 3, 1999, pgs. 285–287.

It is desirable in the art to increase the power output of single-mode fiber lasers for certain applications. The power output of the laser can be increased by increasing the length of the core and providing more optical pump light. However, the material of the core has power limits that if exceeded may damage the core material. More optical power can also be provided by making the core diameter larger. However, as the core diameter increases, the generation of higher-order modes begin to develop, and it becomes increasingly more difficult to limit the beam to a single-mode. Once a certain core size is reached, it is virtually impossible to limit the propagation modes to a single-mode. Further, as the size of the core and the power increases, the generation of heat in the core also increases. Cooling systems are known to reduce this heat, but larger diameter cores makes it more difficult to remove the heat from the center of the core. Therefore, a heat gradient may exist across the core, which causes the laser to decrease its performance.

The core of a dual-clad fiber laser tends to have a length on the order of 50 m. Therefore, the core is typically wrapped around a mandrel to decrease the size of the laser system and give the core structural rigidity. As the size of the core and associated cladding increases, it is more difficult to bend the core around the mandrel and still maintain mode-control, thus causing the mandrel to have to be larger. Also, the size of the core determines how tightly the core can be wrapped on the mandrel before stresses reduce or eliminate mode control caused by light leakage.

What is needed is a single-mode fiber laser that has increased power over those fiber lasers known in the art without losing mode control and that allows effective laser cooling. It is therefore an object of the present invention to provide such a laser.

SUMMARY OF THE INVENTION

In accordance with the teachings of the present invention, a single-mode fiber laser is disclosed that provides increased power. The fiber laser includes a ribbon having a plurality of parallel waveguides that generate a sheet of optical light. Each waveguide includes a rectangular shaped core that has a relatively thin dimension in one direction and a relatively wide dimension in an orthogonal direction. Step-index cladding layers are provided in the thin dimension to limit the propagation of light in the core to a single-mode in that direction. Mode filters are provided adjacent the ends of the core in the wide dimension and the various propagation modes in the core enter the mode filters. The mode filters allow the desirable single-mode to propagate in the core with the least amount of loss, while higher order modes suffer greater losses. Light absorbing layers are provided adjacent the mode filters and opposite the core to absorb the undesirable propagation modes of the light. Therefore, the main propagation mode in the core is a single low order mode, but the cross-sectional area of the core is increased to provide more power.

Each of the cores in the ribbon are optically pumped from the side by a bar of diode arrays positioned at strategic locations along the length of the ribbon relative to the waveguides. Various transmission gratings and/or reflection gratings can be provided within a ribbon jacket to launch the optical pump light down the waveguide in a manner that causes total internal reflection of the light to trap it within the waveguides as it crosses the core multiple times. The ribbon can be wrapped around a mandrel and a cooling fluid can be introduced through the mandrel to conductively cool the ribbon during laser operation. Multiple mandrels can be combined to provide multiple ribbons to increase the cross-sectional area of the resulting laser beam.

Additional objects, advantages and features of the present invention will become apparent from the following description and appended claims, taken in conjunction with the accompanying drawings.

BRIEF DESCRIPTION OF THE DRAWINGS

FIG. 2(a) is a top view and FIG. 2(b) is an end view of a plurality of the fiber waveguides shown in FIG. 1 connected together to form a fiber ribbon;

DETAILED DESCRIPTION OF THE PREFERRED EMBODIMENTS

The following discussion of the preferred embodiments directed to a diodepumped fiber ribbon laser is merely exemplary in nature, and is in no way intended to limit the invention or its applications or uses.

Figure 1A:
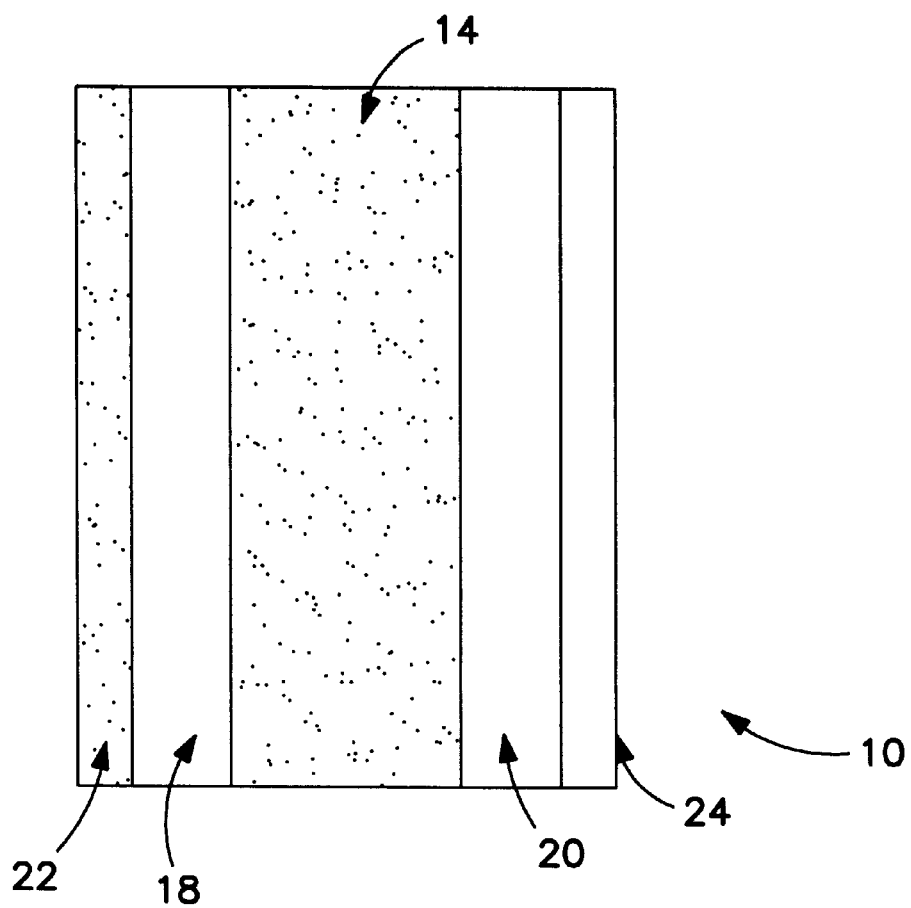
FIG. 1(a) is a top view and FIG. 1(b) is an end view of a single-mode fiber waveguide including a rectangular core, according to an embodiment of the present invention.
Figure 1B:
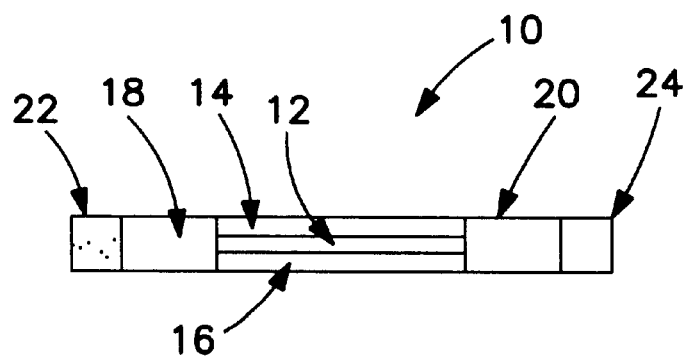

FIG. 1(a) is a top view and FIG. 1(b) is an end view of an optical waveguide 10 that can be used in a diode-pumped, single-mode, fiber laser system, as will be discussed below. The laser beam is amplified in a rectangular shaped core 12 or lasing medium. In one embodiment, the core 12 is a ytterbium-doped glass, but can be any suitable light amplification medium as would be known in the art. The rectangular shape of the core 12 defines a thin structure, where the narrow thickness dimension from the top to the bottom of the core 12 is on the order of 5–10 microns to allow propagation of only a single-mode beam in the thickness direction. The core 12 is bound on its upper and lower sides by step-index cladding layers 14 and 16 that provide propagation for the single optical propagation mode. In one embodiment, the cladding layers 14 and 16 are a doped glass having a different index of refraction than the core 12 to cause the beam travelling in the core 12 to be refracted and reflected back into the core 12. The core 12 is significantly wider in a width dimension that allows the cross-sectional area of the core 12 to be larger than the known cores in single-mode fiber lasers to increase the power output of the laser beam. The technique for limiting the propagation of a single-mode beam in the width direction will be discussed below.

A first mode filter 18 is provided along one side of the core 12 and a second mode filter 20 is provided along the opposite side of the core 12 in the width dimension. The various propagation modes that may be travelling through the core 12 expand out of the core 12 in the width dimension and enter the mode filters 18 and 20. The mode filters 18 and 20 can comprise a series of doped glass layers that are optimized to interact with the various propagation modes of optical light in the core 12 to cause the desirable propagation mode to experience the least amount of losses, and the undesirable or high-order propagation modes to suffer greater losses. The various layers in the mode filters 18 and 20 include alternating regions of high and low refractive indexes to define grating layers to provide this function. The refractive index in the mode filters 18 and 20 can be controlled by different dopant ions. The mode filters 18 and 20 can be any suitable guide structure that performs the operation as discussed herein, such as a Bragg grating or photonic band gap materials. As is known in the art, photonic band gap materials provide interaction of different indexes of refraction to allow scattered optical beams to combine destructively and constructively depending on their phase relationship.

A first absorber layer 22 is positioned adjacent the mode filter 18 opposite the core 12, and a second absorber layer 24 is positioned adjacent the mode filter 20 opposite the core 12. The absorber layers 22 and 24 would also be made of doped silica or glass where the dopant ions absorb the wavelengths of the laser light. The absorber layers 22 and 24 do not provide discrimination of reflection angles, but absorb all of the laser wavelengths. The absorber layers 22 and 24 can be any optical glass absorber material suitable for the purposes described herein. By operation of the waveguide 10, the desirable lowest-order mode is allowed to propagate down the core 12, and the higher-order modes are caused to be absorbed by the absorber layers 22 and 24.

The waveguide 10 is the basic building block of a fiber ribbon laser of the invention. FIG. 2(a) shows a top view and FIG. 2(b) shows an end view of a fiber ribbon 30 that includes a plurality of the waveguides 10 joined together in a parallel manner. One of the waveguides 10 is labeled with the reference numerals discussed above for FIG. 1, with the understanding that the other parallel waveguides 10 have the same components. As shown, the absorber layers 22 and 24 abut against a respective absorber layer 22 or 24 of an adjacent waveguide 10. The absorber layers 22 and 24 between the cores 12 attenuate rejected modes and control coupling therebetween. In this example, six separate waveguides 10 are joined in parallel. As will be appreciated by those skilled in the art, this is by way of a non-limiting example in that other designs may incorporate more of less waveguides. The configuration of the waveguides 10 to form the fiber ribbon 30 is such that a sheet of parallel laser beams propagate out of the end of the ribbon 30, where each laser beam comprises the same single-mode beam. The organized sheet of laser beams can be effectively couple and aligned to output optics of the laser system in a much more effective manner than the jumbled, round fiber laser waveguides used in the prior art.

An outer jacket 32 encloses the waveguides 10 to define the ribbon 30. The top layer of the jacket 32 is not shown in FIG. 2(a) to expose the waveguides 10 below. Edge reflectors 34 and 36 are provided in the outer jacket 32 to help confine the laser pump light, as will become apparent from the discussion below. The edge reflectors 34 and 36 can be any suitable reflective layer, such as a metal layer formed at the sides of the jacket 32.

Figure 3:
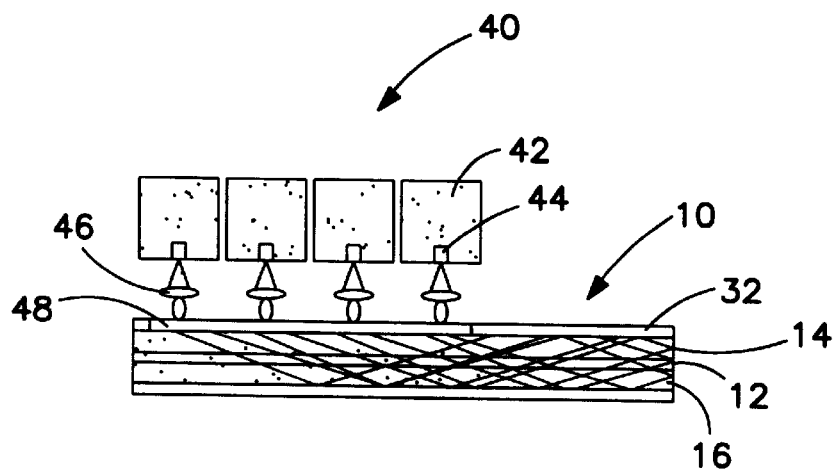
FIGS. 3–5 show three techniques for side-pumping the waveguides shown in FIGS. 1 and 2 with a diode array.
Figure 4:
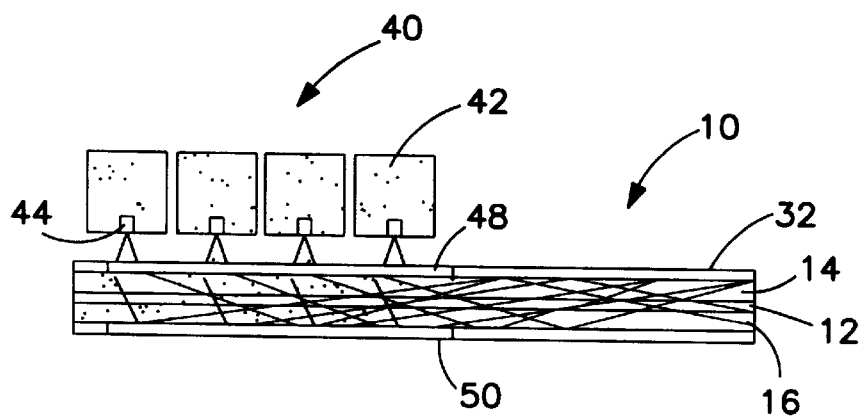
Figure 5:
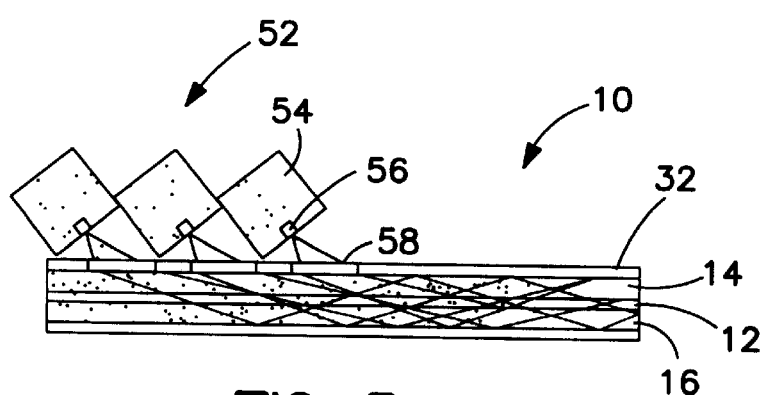

As is known in the art, pump light is required in these types of solid-state lasers to excite the atoms within the core 12 to amplify the laser light. Known diode-pumped lasers generally provide the pump light from an end of the core. In these systems, complex optics are sometimes required for providing coupling of both the pump light and the laser light from the same location. According to the present invention, the pump light is provided from a side location of the ribbon 30 to pump the laser. FIGS. 3–5 are cross-sectional views through one of the waveguides 10 of the ribbon 30 in connection with a pumping source. The various embodiments shown in FIGS. 3–5 for introducing pump light into the ribbon 30 are intended to show that different applications for introducing the pump light can be used in different designs depending on the particular design requirements. In the FIGS. 3–5, the various layers of the waveguides 10 are labeled in the same manner as discussed above.

In FIG. 3, a diode bar 40 including several diode arrays 42 is provided, where each diode array 42 includes a plurality of diode emitters 44. Each diode array 42 extends across the ribbon 30 so that each emitter 44 in the array 42 aligns with the core 12 of a particular waveguide 10. In this example, four diode arrays 42 are provided in the diode bar 40 so that each waveguide 10 receives pump light from four of the emitters 44 to provide the necessary optical pumping for a particular application. Each diode emitter 44 generates a beam of pump light that is directed towards a collimating lens 46. In this embodiment, each collimating lens 46 extends across the ribbon 30 for each diode array 42.

The pump light from the diode arrays 42 is collimated and impinges a blazed uniform transmission grating 48 provided in a section of the outer jacket 32. The transmission grating 48 refracts the pump light from the diode arrays 42 so that it enters the particular waveguide 10 at a certain angle. The transmission grating 48 can be any suitable optical material that diffracts the pump light. For example, the transmission grating 48 can be polished glass including etched grating lines. The angle of the pump light propagating across the waveguide 10 and the difference in the indices of refraction of the jacket 32 and the cladding layers 14 and 16 provides total internal reflection to cause the pump light to be reflected back and forth down the waveguide 10 so that it continually crosses the core 12 multiple times as shown. The wavelength of the pump light from the diode arrays 42 is such that it excites the atoms in the core 12 so that most of the pump light is eventually absorbed by the core 12 to provide the laser pumping. The edge reflectors 34 and 36 help confine the pump light in the ribbon 30 that may happen to propagate out the sides of the ribbon 30.

In the embodiment of FIG. 4, the bar 40 of the diode arrays 42 are provided, but the collimating lenses 46 are eliminated. In addition to the transmission grating 48, a reflection grating 50 is provided in an opposite wall of the jacket 32 to reflect the pump light within the waveguide 10. Because the collimating lenses 46 have been eliminated, the transmission grating 48 has a grating periodicity related to the wavelength of the pump light to cause it to be focussed into the waveguide 10. In other words, the pump light is refracted through the transmission grating 48 to launch the pump light down the waveguide 10. The reflection grating 50 is a reflective surface instead of a transmission surface, where the etched lines in the grating 50 cause the pump light to be reflected at an angle desirable to capture the pump light within the waveguide 10 by total internal reflection.

In FIG. 5, the bar 40 of diode arrays 42 is replaced with a bar 52 of diode arrays 54 including emitters 56. The collimating lens 46 are eliminated in this embodiment, and the diode arrays 54 are angled relative to the waveguide 10 so that the pump light enters the waveguide 10 through transmission gratings 58 in a desirable manner to provide optical pumping of the core 12. This embodiment provides a segmented chirped transmission grating application to launch the pump light down the waveguide 10 so that it is trapped therein.

Figure 6:
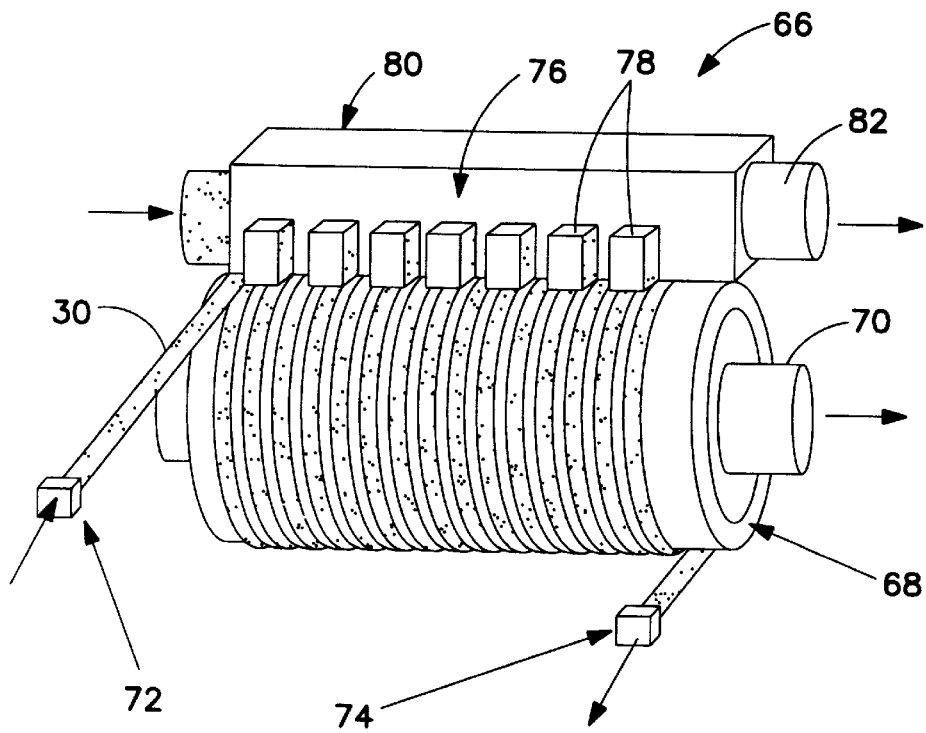
FIG. 6 is a perspective view of a laser assembly employing the fiber ribbon shown in FIG. 2.

FIG. 6 shows a perspective view of a laser system 66 where the fiber ribbon 30 is helically wrapped around a cylindrical mandrel 68. Because the fiber ribbon 30 is relatively thin in the thickness dimension, it can be relatively tightly wrapped around the mandrel 68 to reduce system size. A tube 70 extends through the mandrel 68 where the mandrel 68 acts as a heat sink to allow a cooling fluid to be pumped therethrough to cool the fiber 30 during laser operation. Because the mandrel 68 has significant surface area and the fiber ribbon 30 is relatively thin, appropriate cooling of the ribbon 30 can be provided by the cooling fluid and the mandrel 68 to eliminate heat gradients for proper device performance.

Coupling optics 72 are provided at an input end of the fiber ribbon 30 to couple the input laser beam to be amplified by the fiber ribbon 30. Coupling optics 74 are provided at an output end of the fiber 30 to couple the amplified laser beam to the output optics of the laser system 66. The optical pumping is provided by a bank 76 of diode bars 78. Each diode bar 78 includes a plurality of diode arrays of the type as discussed above, where the diode arrays extend across the ribbon 30 so that a diode emitter is aligned with each core 12. In this embodiment, the diode bars 78 are provided in a row along the mandrel 68 at every other wrap location, so that optical pumping is provided every certain predetermined distance along the fiber ribbon 30. In other embodiments, the diode bars 78 can be provided at different locations around the mandrel 68 for different pumping and different applications. A cooling system 80, including a cooling tube 82, directs a cooling fluid to cool the diode arrays 78.

Figure 7:
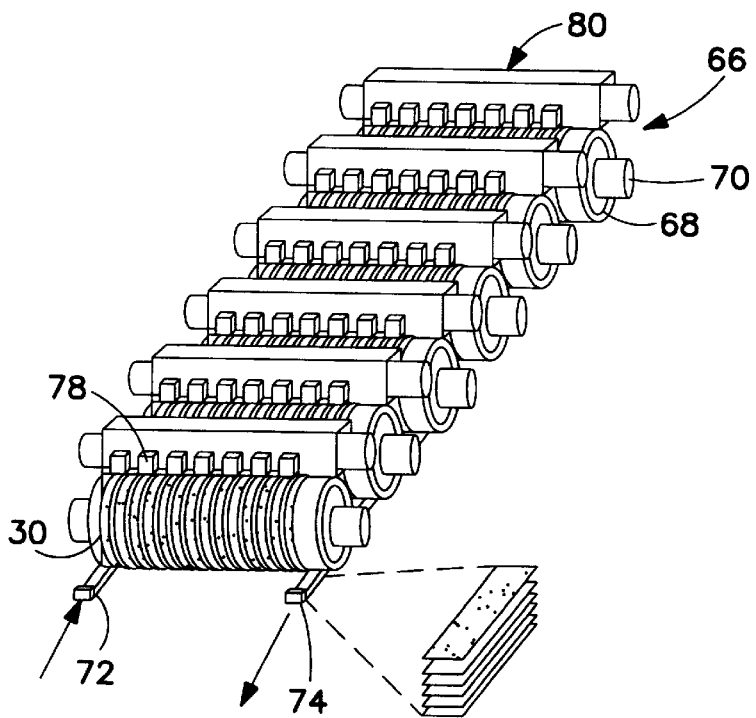
FIG. 7 is a perspective view of a plurality of the laser assemblies shown in FIG. 6 connected together to increase laser beam size.

The configuration of the laser system 66 discussed above provides a suitable length of the fiber ribbon 30 that is able to be tightly wrapped around the mandrel 68 to provide a compact laser assembly at an increased power over the prior art. To further increase the power, multiple laser assemblies 66 can be provided to stack the fibers. In FIG. 7, a perspective view an array 86 of laser systems 66 is shown where the optics 74 couple the output from a plurality of ribbons 30, here six ribbons 30 into a single beam, as shown.

The foregoing discussion discloses and describes merely exemplary embodiments of present invention. One skilled in the art will readily recognize from such discussion and from the accompanying drawings and claims, that various changes, modifications and variations can be made therein without departing from the spirit and scope of the invention as defined in the following claims. Additional optics (not shown) can be provided to shape the output beam from the coupling optics 74 for a desirable beam shape.

What is claimed is:

1. An optical waveguide comprising:
    a core, said core including opposing top and bottom surfaces and opposing first and a second side surfaces, wherein the opposing top and bottom surfaces are closer together than the opposing first and second side surfaces to form a thin core;
    a first cladding layer positioned against the top surface and a second cladding layer positioned against the bottom surface, said first and second cladding layers trapping an optical propagation mode within the core; and
    a first mode filter positioned adjacent to and in contact with the first side surface and a second mode filter positioned adjacent to and in contact with the second side surface, said first and second mode filters directing the optical propagation mode into the core and directing other propagation modes away from the core.

2. The waveguide according to claim 1 wherein the core is rectangular shaped.

3. The waveguide according to claim 2 wherein the distance between the opposing top and bottom surfaces is between 5 and 10 microns.

4. The waveguide according to claim 1 wherein the first and second mode filters include a plurality of layers including layers of alternating high and low indexes of refraction.

5. The waveguide according to claim 4 wherein the mode filters are photonic band-gap filters.

6. The waveguide according to claim 1 further comprising a first absorber layer positioned adjacent the first mode filter and opposite the core, and a second absorber layer positioned adjacent the second mode filter and opposite the core, said first and second absorber layers attenuating the propagation modes that are directed away from the core.

7. The waveguide according to claim 1 wherein the first and second cladding layers are step-index cladding layers that limit propagation in the core to a single mode.

8. The waveguide according to claim 7 wherein the mode filters direct the single propagation mode towards the core and direct higher-order propagation modes away from the core.

9. The waveguide according to claim 1 wherein the core is made of a ytterbium-doped glass.

10. A single-mode optical waveguide comprising a rectangular-shaped core including opposing top and bottom surfaces and opposing first and second side surfaces where the opposing top and bottom surfaces are closer together than the opposing first and second side surfaces, said waveguide further comprising step-index cladding layers positioned against the top and bottom surfaces and a first mode filter positioned adjacent the first side surface and a second mode filter positioned adjacent the second side surface.

11. The waveguide according to claim 10 wherein the distance between the opposing top and bottom surfaces is between 5 and 10 microns.

12. The waveguide according to claim 10 further comprising a first absorber layer positioned adjacent the first mode filter and opposite the core and a second absorber layer positioned adjacent the second mode filter and opposite the core, said first and second absorber layers attenuating the propagation modes that are directed away from the core.

13. An optical device comprising:
a waveguide structure, said waveguide structure including at least one elongated core and at least one cladding layer positioned adjacent the core, said at least one cladding layer defining an optical propagation mode within the core;
an outer jacket enclosing the waveguide structure, said outer jacket including at least one transmission grating; and
at least one diode positioned relative to the transmission grating, said diode generating pump light that is transmitted through the transmission grating and the at least one cladding layer into the waveguide structure at an angle that traps the pump light in the waveguide by total internal reflection.

14. The device according to claim 13 wherein the core is a rectangular core including opposing top and bottom surfaces and opposing first and second side surfaces where the top and bottom surfaces are closer together than the opposing first and second side surfaces.

15. The device according to claim 14 wherein the at least one cladding layer is a first cladding layer positioned against the top surface and a second cladding layer positioned against the bottom surface and wherein the pump light reflects off of an interface between the outer jacket and the first or second cladding layer.

16. The device according to claim 13 further comprising at least one collimating lens that collimates the pump light before it is transmitted through the transmission grating.

17. The device according to claim 13 further comprising a reflection grating positioned in the outer jacket and opposite to the transmission grating, said reflection grating reflecting the pump light so that it is trapped within the waveguide structure.

18. The device according to claim 13 wherein the waveguide structure includes a plurality of waveguides connected together in a parallel manner and defining a waveguide ribbon, said at least one diode is at least one diode array including a plurality of emitters where an emitter is aligned with each waveguide in the ribbon.

19. The device according to claim 18 wherein the at least one diode array is a plurality of diode arrays defining a diode bar where the plurality of diode arrays are strategically positioned along a length of the waveguides.

20. An optical device comprising:
a plurality of waveguides attached together to form a waveguide fiber ribbon, each of the waveguides including an elongated core, said core including opposing top and bottom surfaces and opposing first and a second side surfaces, said waveguides further including a first step-index cladding layer positioned against the top surface and a second step-index cladding layer positioned against the bottom surface, said first and second cladding layers trapping a single optical propagation mode within the core, said waveguides further including a first mode filter positioned against the first side surface and a second mode filter positioned against the second side surface, said first and second mode filters directing the optical propagation mode into the core and directing other propagation modes away from the core;
a plurality of absorber layers positioned between the waveguides and coupling the waveguides together, said plurality of absorber layers attenuating the propagation modes that are directed away from the core; and
an outer jacket encapsulating the waveguide ribbon and the absorber layers.

21. The device according to claim 20 further comprising at least one array of diodes and a transmission grating, said transmission grating being positioned in the jacket, said diodes generating laser pump light that is transmitted through the transmission grating and the first cladding layer into the waveguides at an angle that traps the pump light in the waveguides by total internal reflection.

22. The device according to claim 21 further comprising at least one collimating lens that collimates the pump light before it goes through the transmission grating.

23. The device according to claim 21 wherein the at least one array of diodes is angled relative to the waveguides so that the pump light goes through the transmission grating at an acute angle relative to the core that traps the pump light in the waveguides.

24. The device according to claim 21 further comprising a reflection grating positioned in the jacket opposite to the transmission grating, said reflection grating reflecting the pump light so that it is trapped within the waveguides.

25. The device according to claim 20 further comprising a cylindrical mandrel, said fiber ribbon being wrapped around the mandrel a plurality of times, said mandrel including a hollow center channel that accepts a cooling fluid.

26. The waveguide according to claim 20 wherein the core is rectangular shaped and wherein the opposing top and bottom surfaces are closer together than the opposing first and second side surfaces.

27. The waveguide according to claim 26 wherein the distance between the opposing top and bottom surfaces is between 5 and 10 microns.

28. A method for providing propagation of a single-mode of a laser beam down a waveguide, said method comprising the steps of:
propagating the beam down a core in the waveguide that includes opposing top and bottom surfaces and opposing first and second side surfaces, wherein the opposing top and bottom surfaces are closer together than the opposing first and second side surface to form a thin core;

reflecting the laser beam off of a first cladding layer positioned against the top surface and a second cladding layer positioned against the bottom surface;

refracting the single mode of the beam into the core by a first mode filter positioned adjacent the first side surface and a second mode filter positioned adjacent the second side surface; and refracting other propagation modes of the laser beam away from the core by the first and second mode filters.

29. The method according to claim 28 further comprising the step of absorbing the other propagation modes of the laser beam that are guided away from the core by optical absorber layers.

30. The method according to claim 28 further comprising the step of pumping the core with pump light through the first cladding layer.

31. The method according to claim 28 further comprising the step of attaching a plurality of cores together in a parallel manner to provide a plurality of single-mode laser beams.

* * * * *